(12) United States Patent
Takayama

(10) Patent No.: US 10,016,834 B2
(45) Date of Patent: Jul. 10, 2018

(54) WELDING TORCH DETECTOR AND WELDING ROBOT SYSTEM

(71) Applicant: FANUC Corporation, Yamanashi (JP)

(72) Inventor: Yuusuke Takayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 198 days.

(21) Appl. No.: 14/633,754

(22) Filed: Feb. 27, 2015

(65) Prior Publication Data

US 2015/0246406 A1  Sep. 3, 2015

(30) Foreign Application Priority Data

Feb. 28, 2014 (JP) .................. 2014-039435

(51) Int. Cl.
| | |
|---|---|
| *B23K 9/095* | (2006.01) |
| *B23K 9/173* | (2006.01) |
| *B23K 9/32* | (2006.01) |

(52) U.S. Cl.
CPC ............ *B23K 9/0956* (2013.01); *B23K 9/173* (2013.01); *B23K 9/32* (2013.01)

(58) Field of Classification Search
CPC ........ B23K 9/0956; B23K 9/095; B23K 9/32; B23K 9/173
See application file for complete search history.

(56) References Cited

U.S. PATENT DOCUMENTS

| | | |
|---|---|---|
| 5,845,053 A | 12/1998 | Watanabe et al. |
| 2004/0011775 A1 | 1/2004 | Hackl et al. |
| 2006/0208029 A1* | 9/2006 | Suzuki .................. B23K 9/126 228/8 |
| 2010/0200554 A1 | 8/2010 | Uchida et al. |
| 2011/0006047 A1* | 1/2011 | Penrod ................. B23K 9/0956 219/137 R |

FOREIGN PATENT DOCUMENTS

| | | |
|---|---|---|
| CN | 1471448 A | 1/2004 |
| CN | 101352778 A | 1/2009 |
| CN | 101687282 A | 3/2010 |
| CN | 103084706 A | 5/2013 |
| CN | 103370162 A | 10/2013 |
| JP | 62-168677 A | 7/1987 |
| JP | 4-232512 A | 8/1992 |
| JP | 5-77046 A | 3/1993 |
| JP | 5-123866 A | 5/1993 |
| JP | 6-238447 A | 8/1994 |

(Continued)

*Primary Examiner* — Brian Jennison

(74) *Attorney, Agent, or Firm* — Hauptman Ham, LLP

(57) ABSTRACT

A welding torch detector including an imaging unit capturing images of a welding torch and welding wire from a plurality of directions to acquire image signals, an image recognition unit recognizing welding wire images and welding torch images based on the image signals acquired, a setting unit setting a target point corresponding to a target position of the welding wire on the welding wire images recognized, a position detection unit detecting a position of the target point in a three-dimensional space based on the welding wire images recognized, and an inclination detection unit detecting an inclination of the welding torch in the three-dimensional space based on the welding torch images recognized.

8 Claims, 11 Drawing Sheets

(56) References Cited

FOREIGN PATENT DOCUMENTS

| | | |
|---|---|---|
| JP | 8-123536 A | 5/1996 |
| JP | 2000-351072 A | 12/2000 |
| JP | 4665243 B2 | 4/2011 |
| JP | 2012-218058 A | 11/2012 |
| KR | 101017503 B1 | 2/2011 |

\* cited by examiner

WELDING TORCH DETECTOR AND WELDING ROBOT SYSTEM

RELATED APPLICATIONS

The present application claims priority to Japanese Application Number 2014-039435, filed Feb. 28, 2014, the disclosure of which is hereby incorporated by reference herein in its entirety.

BACKGROUND OF INVENTION

1. Field of the Invention

The present invention relates to a welding torch detector for detecting inclination of a welding torch provided at a welding robot, and a welding robot system.

2. Description of the Related Art

There has been known a device having a welding torch provided at an arm tip part of a welding robot and configured to detect an amount of deviation between a tip position of a welding wire fed from the welding torch and a predetermined target position of the welding wire. For example, the device described in Japanese Patent Publication No. 4665243 (JP4665243B) measures the tip position of the welding wire by a laser sensor, and acquires a deviation amount of the wire tip position from the predetermined target position. The device also measures a tip position of the welding torch by a measuring unit, and acquires a deviation amount of the torch tip position from a reference position.

The welding torch provided at the arm tip part is relatively long. Consequently, for example, when the welding torch is deformed to bend after instructing the robot, there is a possibility that the welding torch may interfere with a welding tool or a peripheral device. In this connection, since the device described in JP4665243B measures only the tip position of the welding wire and the tip position of the welding torch, it is difficult to prevent interference of the welding torch when the welding torch is deformed.

SUMMARY OF THE INVENTION

According to a first aspect of the present invention, a welding torch detector includes an imaging unit configured to capture images of a welding torch provided at an arm tip part of a welding robot and a welding wire fed from the welding torch from a plurality of directions, and acquire image signals of the welding torch and the welding wire, an image recognition unit configured to recognize, based on the image signals acquired by the imaging unit, a plurality of welding wire images representing the welding wire seen from the plurality of directions and a plurality of welding torch images representing the welding torch seen from the plurality of directions, a setting unit configured to set a target point corresponding to a target position of the welding wire on the plurality of welding wire images recognized by the image recognition unit, a position detection unit configured to detect, based on the plurality of welding wire images recognized by the image recognition unit, a position of the target point in a three-dimensional space, and an inclination detection unit configured to detect, based on the plurality of welding torch images recognized by the image recognition unit, an inclination of the welding torch in the three-dimensional space.

According to another aspect of the present invention, a welding robot system includes the above-described welding torch detector, a torch moving unit configured to move the welding torch, a wire feeding unit configured to feed the welding wire from the welding torch, and a control unit configured to control the torch moving unit, the wire feeding unit, and the imaging unit. The control unit controls the imaging unit to capture images of the welding torch and the welding wire from a plurality of directions.

BRIEF DESCRIPTION OF THE DRAWINGS

The objects, features, and advantages of the present invention will become more apparent from the following detailed description of the exemplary embodiments of the present invention taken in connection with the accompanying drawings, in which.

DETAILED DESCRIPTION

Figure 1:
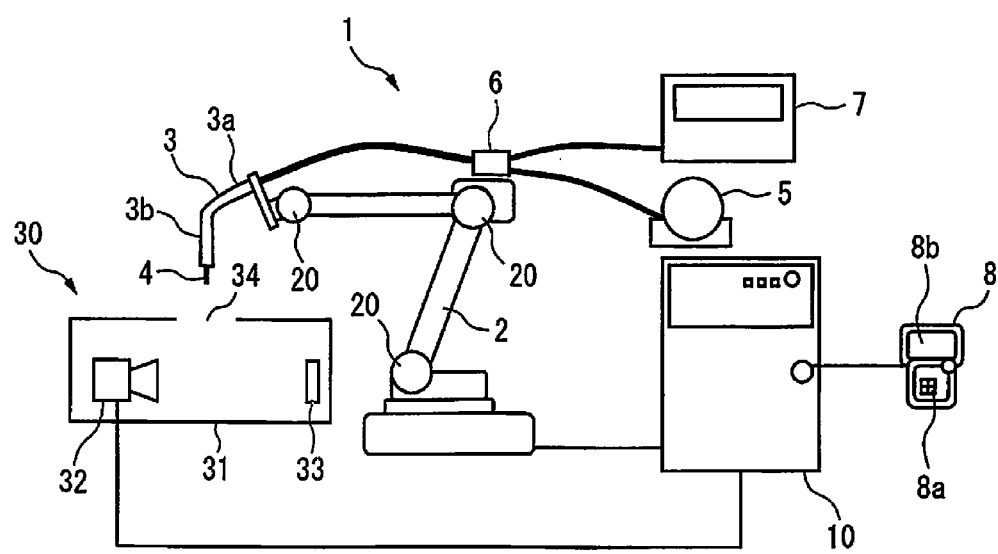
FIG. 1 is a diagram illustrating an overall configuration of a welding robot system according to an embodiment of the present invention.

Hereinafter, a welding robot system according to an embodiment of the present invention will be described referring to FIGS. 1 to 15. FIG. 1 is a diagram illustrating an overall configuration of the welding robot system according to the embodiment of the present invention. The welding robot system includes a welding robot 1 configured to perform arc welding, and a robot controller 10 configured to control the welding robot.

The welding robot 1 is an articulated robot including a plurality of rotatable arms 2. A servo motor 21 (FIG. 2) is installed at each joint part 20 of the arm 2, and a position and an attitude of an arm tip part are changed by driving of the servo motor 21. A welding torch 3 is provided at a tip part of the arm 2, and a position and an attitude of the welding torch 3 are changed by rotation of the arm 2. The welding torch 3 includes a first extension part 3a extending from an arm base end part and an second extension part 3b extending from a tip of the first extension part 3a at a predetermined angle relative to the first extension part 3a, and can inject shield gas such as argon or carbon dioxide from a tip of the second extension part 3b.

A welding wire 4 protrudes from a tip of the welding torch 3 (second extension part 3b). The welding wire 4 is wound on a welding wire stand 5 via a wire feeder 6, and fed from the tip of the welding torch 3 by the wire feeder 6. A welding machine 7 communicates with the robot controller 10, charges the welding wire 4 according to a command from the robot controller 10, and controls the wire feeder 6.

On a side of the welding robot 1, an imaging device 30 is provided to capture images of the welding torch 3 and the welding wire 4. The imaging device 30 includes a dustproof cover 31, a camera 32 installed in the interior of the dustproof cover 31, and a light source 33 configured to illuminate an imaging region. The welding torch 3 can advance into or move out of the dustproof cover 31 through an opening part 34. The camera 32 includes image sensors such as charge-coupled devices (CCDs), and an image signal acquired by the camera 32 is input to the robot controller 10.

The robot controller 10 outputs a control signal to the arm driving servo motor 21 of the welding robot 1 (FIG. 2) to control the position and the attitude of the welding torch 3, and outputs a control signal to the camera 32 to control an image capturing operation of the camera 32. The robot controller 10 can also control a robot additional shaft configured to drive the wire feeder 6. An instruction operation panel 8 is connected to the robot controller 10. The instruction operation panel 8 includes an input unit 8a configured to input various types of commands for instructing an operation of the welding robot 1, and a display unit 8b configured to display various types of information regarding the operation instruction.

Figure 2:
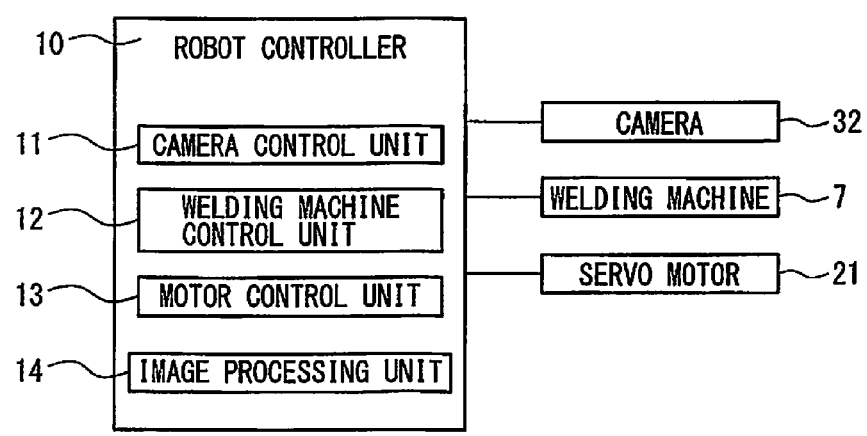
FIG. 2 is a block diagram illustrating a control configuration of the welding robot system according to the embodiment of the present invention.

FIG. 2 is a block diagram illustrating a control configuration of the welding robot system. As illustrated in FIG. 2, the camera 32, the welding machine 7 and the arm driving servo motor 21 are connected to the robot controller 10. The robot controller 10 is configured by including an arithmetic processing device that includes a central processing unit (CPU), a read-only memory (ROM), a random access memory (RAM), and other peripheral circuits, and includes, as functional components, a camera control unit 11 configured to control the image capturing operation of the camera 32, in other words, operations of the camera 32 and the light source 33, a welding machine control unit 12 configured to control feeding of the welding wire 4 by the welding machine 7, a motor control unit 13 configured to control driving of the servo motor 21, and an image processing unit 14 configured to execute predetermined processing based on an image signal from the camera 32.

Figure 3:
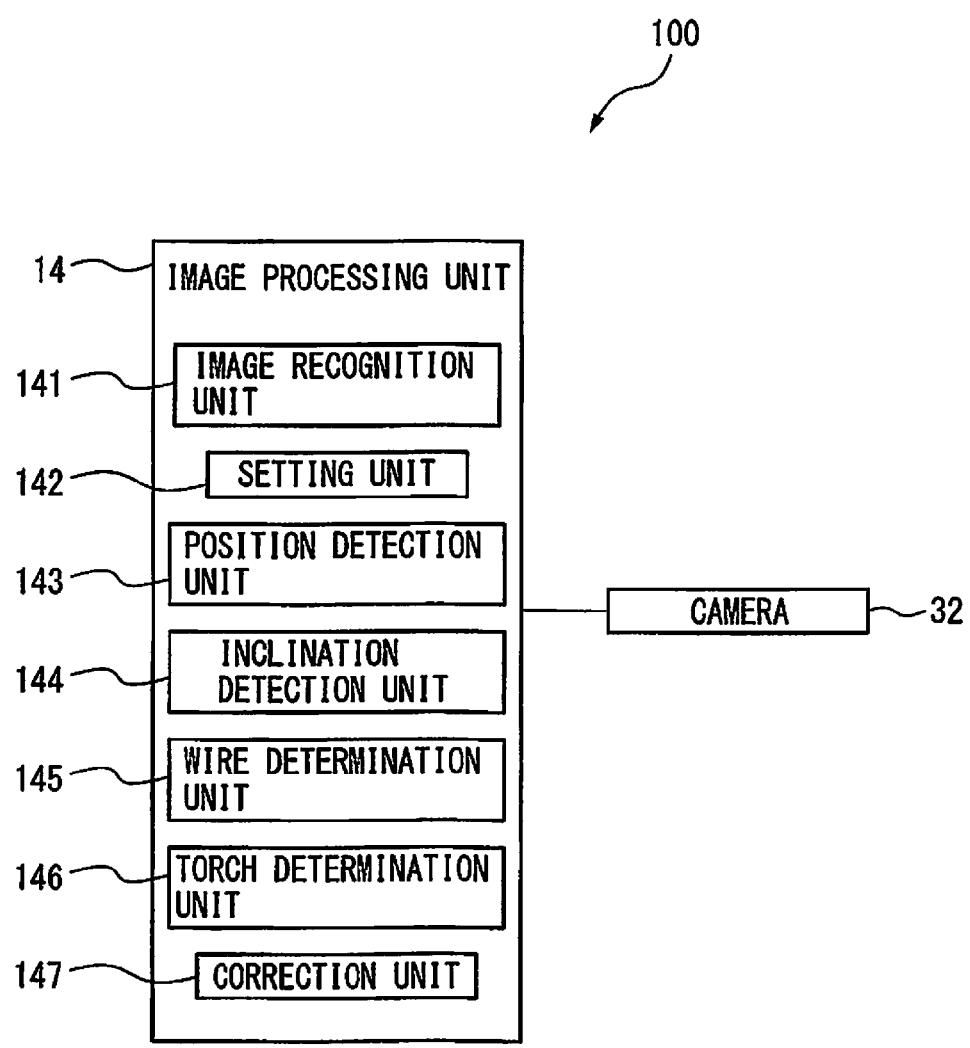
FIG. 3 is a block diagram illustrating a configuration of a welding torch detector according to an embodiment of the present invention.

FIG. 3 is a block diagram illustrating a configuration of a welding torch detector 100 according to an embodiment of the present invention. As illustrated in FIG. 3, the welding torch detector 100 includes the camera 32 and the image processing unit 14. The image processing unit 14 includes an image recognition unit 141, a setting unit 142, a position detection unit 143, an inclination detection unit 144, a wire determination unit 145, a torch determination unit 146, and a correction unit 147.

Figure 4:
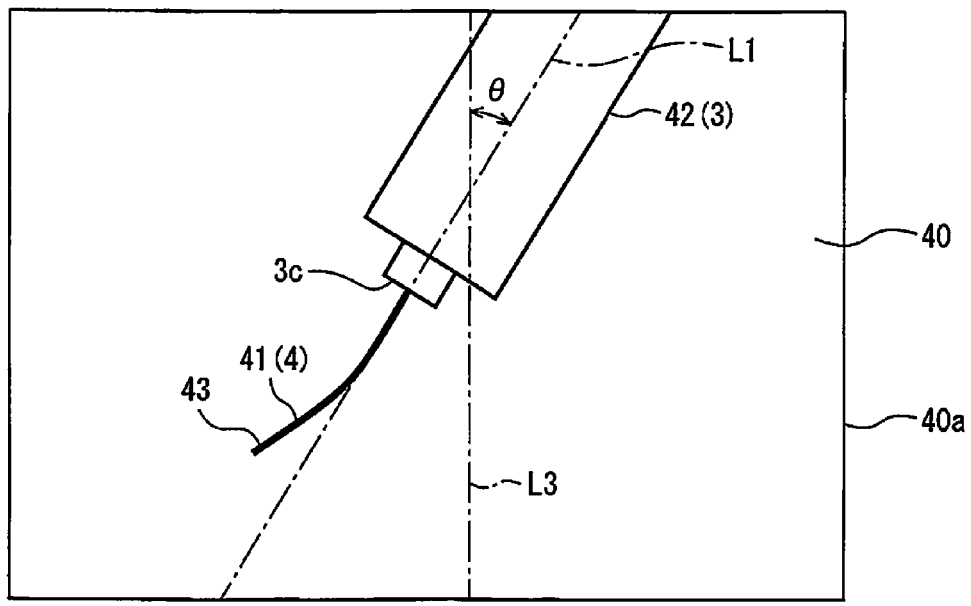
FIG. 4 is a diagram illustrating an example of a camera image captured by a camera illustrated in FIG. 3.

The cameral 32 executes an image capturing operation to acquire an image signal of a predetermined imaging region. FIG. 4 is a diagram illustrating an example of a camera image 40 of an inside of an imaging region 40a acquired in a state of the tip part of the welding torch 3 advanced into the dustproof cover 31. In FIG. 4, a tip 3c of the welding torch 3 (second extension part 3b) is located substantially at the center of the imaging region 40a, and the camera image 40 includes an overall image (welding wire image 41) of the welding wire 4 and an image (welding torch image 42) of the tip part of the welding torch 3. According to the present embodiment, as described below, by moving the welding torch 3 relatively to the camera 32, the image of the tip part of the welding torch 3 is captured from a plurality of directions (first and second directions) by the camera 32. Accordingly, the camera 32 acquires two camera images 40 (first and second camera images).

The image recognition unit 141 recognizes, based on the image signal acquired by the camera 32, shapes of the welding wire 4 and the welding torch 3 by pattern matching. In other words, the image recognition unit 141 compares image patterns representing preset shapes of the welding wire 4 and the welding torch 3 with the camera images 40. Then, the image recognition unit 141 recognizes a welding wire image 41 (first welding wire image) and a welding torch image 42 (first welding torch image) in the first camera image 40, and recognizes a welding wire image 41 (second welding wire image) and a welding torch image 42 (second welding torch image) in the second camera image 40.

The setting unit 142 sets a target point 43 corresponding to a target position (wire target position) of the welding wire 4 on each of the first and second welding wire images 41 recognized by the image recognition unit 141. The wire target position is a target position of a tip of the welding wire 4, and the target point 43 on the welding wire image 41 defines the wire target position. During welding work, a position of the welding wire 4 is controlled so that the target point 43 (tool tip point) can coincide with the wire target position.

Figure 5:
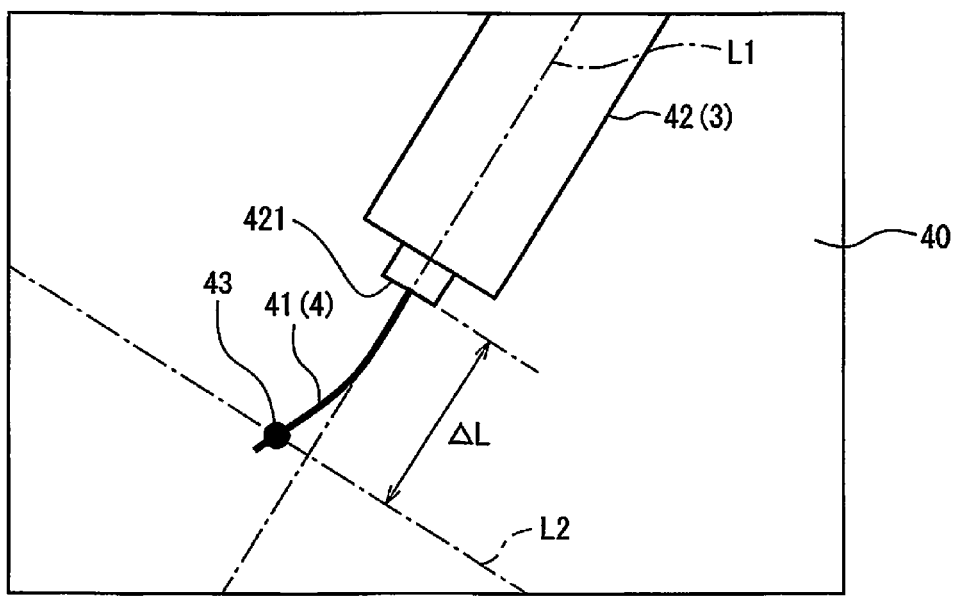
FIG. 5 is a diagram illustrating a setting example of a target point on a welding wire image included in the camera image illustrated in FIG. 4.

FIG. 5 is a diagram illustrating a setting example of the target point 43. As illustrated in FIG. 5, since the welding wire 4 has a habit of bending, the tip part of the welding wire 4 shifts from a center line L1 passed through a longitudinal center of the welding torch 3. Consequently, when the target point 43 is set on the center line L1, the target point 43 shifts from the wire target position. Therefore, the setting unit 142 sets an intersection point between a virtual line L2 away by a predetermined length ΔL from a tip 421 of the welding torch image 42 along the center line L1 and the welding wire image 41 as the target point 43. The predetermined length ΔL corresponds to a protruding length (design value) of the welding wire 4 necessary for acquiring a desired welding quality.

Figure 6:
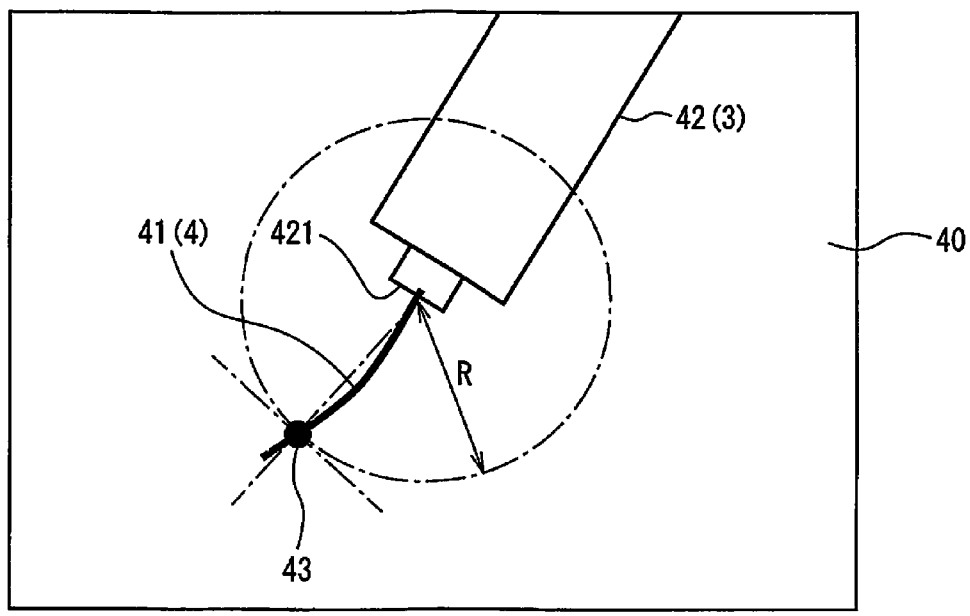
FIG. 6 is a diagram illustrating a modified example of FIG. 5.

FIG. 6 is a diagram illustrating another setting example of the target point 43. In FIG. 6, an intersection point between a circular arc having a predetermined radius R around the tip 421 of the welding torch image 42 and the welding wire image 41 is set as the target point 43. The predetermined radius R corresponds to, for example, the welding wire protruding length ΔL illustrated in FIG. 5.

Figure 7:
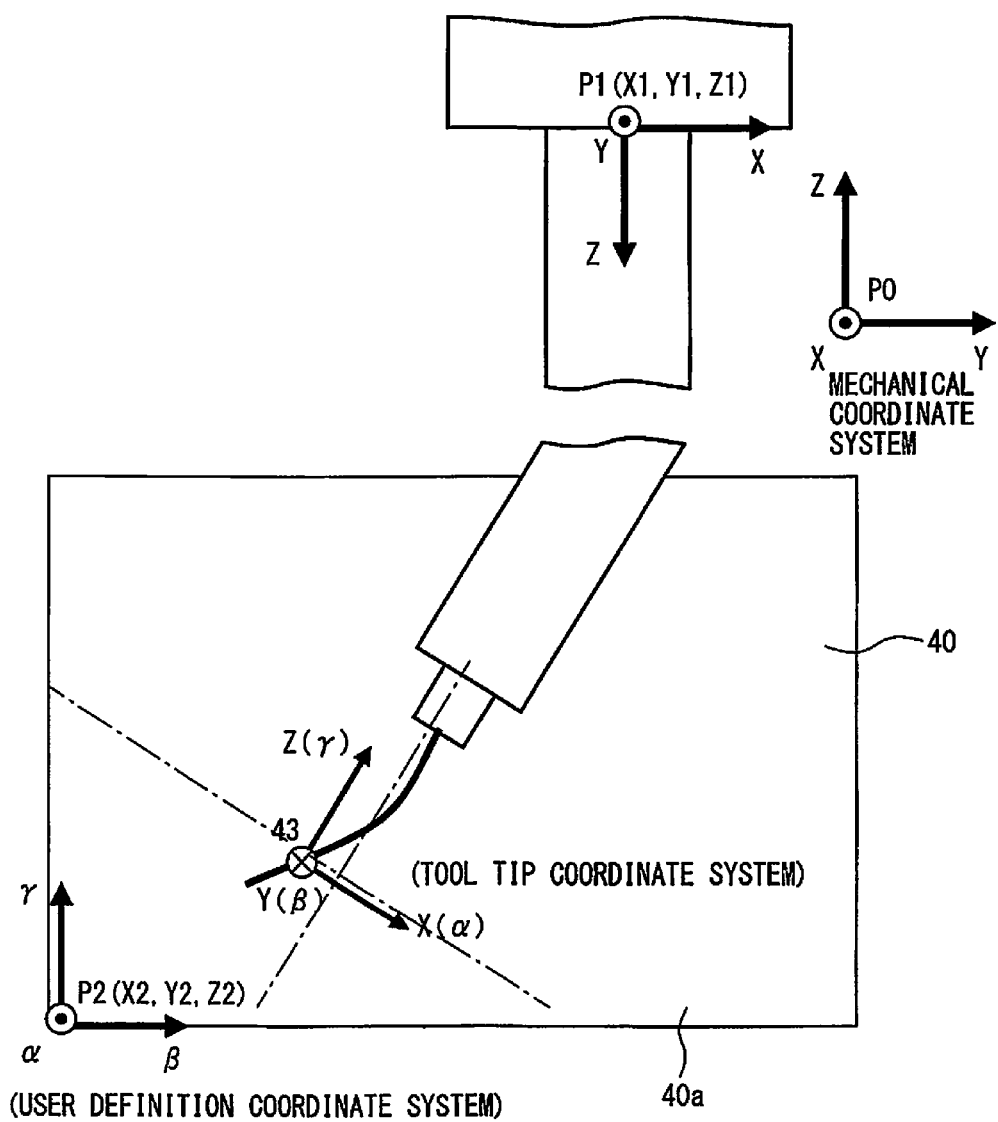
FIG. 7 is a diagram illustrating a relationship between a mechanical coordinate system and a user definition coordinate system.

The position detection unit 143 detects, based on the first and second welding wire images 41 recognized by the image recognition unit 141, a position of the target point 43 in a three-dimensional space. In this case, the position detection unit 143 first calculates a position of the target point 43 on a user definition coordinate system, and then calculates a position of the target point 43 on a mechanical coordinate system. FIG. 7 is a diagram illustrating a relationship between the mechanical coordinate system and the user definition coordinate system. The mechanical coordinate system is a three-dimensional orthogonal coordinate system having X, Y, and Z coordinate axes in which a predetermined position P0 of the welding robot 1 is an origin, and a position (X1, Y1, and Z1) of an arm tip part P1 is represented by the mechanical coordinate system. X, Y, and Z coordinate axes are set at the arm tip part P1, and by rotating the coordinate axes according to an attitude change of the arm tip part P1, an attitude of the arm tip part P1 is also represented by the mechanical coordinate system. The mechanical coordinate system is used for position and attitude control of the welding robot 1, and the position and the attitude of the arm tip part P1 are controlled according to a preset program. The position and the attitude of the arm tip part P1 can be detected by an encoder included in the servo motor 21.

On the other hand, the user definition coordinate system is an orthogonal triaxial three-dimensional coordinate system having an origin set at a predetermined position P2 of the imaging region 40a. Respective coordinate axes ($\alpha$, $\beta$ and $\gamma$ axes) of the user definition coordinate system are parallel to, for example, the respective coordinate axes (X, Y, and Z axes) of the mechanical coordinate system. The origin P2 of the user definition coordinate system is set at a predetermined position (X2, Y2, and Z2) of the mechanical coordinate system. Accordingly, by adding a predetermined value (X2, Y2, and Z2) to a coordinate value of the user definition coordinate system, the coordinate value of the user definition coordinate system can be converted into a coordinate value of the mechanical coordinate system.

Specifically, the position detection unit 143 first calculates, based on the first camera image (first welding wire image 41), a two-dimensional coordinate value of the target point 43 on the user definition coordinate system. Then, the position detection unit 143 converts the two-dimensional coordinate value of the user definition coordinate system into a coordinate value of the mechanical coordinate system by using a positional relationship between the origin P0 of the mechanical coordinate system and the origin P2 of the user definition coordinate system. The position detection unit 143 calculates a difference between the coordinate value and a coordinate value of the arm tip part P1 of the mechanical coordinate system, and calculates a relative position of the target point 43 with respect to the arm tip part P1 in which a first direction is a reference. Similarly, based on the second camera image (second welding wire image 41), the position detection unit 143 calculates a relative position of the target point 43 with respect to the arm tip part P1 in which a second direction is a reference. The position detection unit 143 calculates a three-dimensional position of the target point 43 with respect to the arm tip part P1 by using the two relative positions in which the first and second directions are the references. Thus, by using the camera images 40 captured from the two directions, an accurate position of the target point 43 with respect to the arm tip part P1 can be acquired.

The inclination detection unit 144 detects, based on the first and second welding torch images 42 recognized by the image recognition unit 141, inclination of the welding torch 3 in a three-dimensional space with respect to the arm tip part P1. In this case, the inclination detection unit 144 first calculates an inclination angle $\theta$ of the center line L1 of the welding torch 3 on the two-dimensional image based on the first welding torch image 42. For example, as illustrated in FIG. 4, the inclination detection unit 144 calculates, as the inclination angle $\theta$, an angle of the center line L1 of the welding torch 3 with respect to a virtual line L3 parallel to a predetermined coordinate axis (e.g., $\gamma$ axis) of the user definition coordinate system. Similarly, the inclination detection unit 144 calculates an inclination angle of the center line L1 of the welding torch 3 on the two-dimensional image based on the second welding torch image 42. The inclination detection unit 144 determines an inclination angle in the three-dimensional space by using these two inclination angles on the two-dimensional image. A target point 43 is represented by a tool tip coordinate system by using these inclination angles. Specifically, as illustrated in FIG. 7, the tool tip coordinate system having an orthogonal triaxial three-dimensional coordinate system in which coordinate axes ($\alpha$, $\beta$, and $\gamma$ axes) of the user definition coordinate system are inclined by the inclination angles detected by the inclination detection unit 144 is set as the target point 43. In other words, the tool tip coordinate system in which the target point 43 is an origin is set, and the inclination of the welding torch 3 is represented by the tool tip coordinate system.

Since the coordinate axes ($\alpha$, $\beta$, and $\gamma$ axes) of the user definition coordinate system are parallel to the coordinate axes (X, Y, and Z axes) of the mechanical coordinate system, as illustrated in FIG. 7, coordinate axes of the tool tip coordinate system can be represented as inclinations of the coordinate axes (X, Y, and Z axes) of the mechanical coordinate system. Accordingly, the inclination of the welding torch 3 with respect to the arm tip part P1 can be detected, and presence or absence of deformation of the welding torch 3 and a degree of deformation of the welding torch 3, in other words, an amount of deviation of a shape of the welding torch from its original state, can be understood. The target point 43 is a tool tip point. Hereinafter, the position of the target point 43 and the inclination of the welding torch 3 may be referred to as a position and an inclination of the tool tip point.

Figure 8:
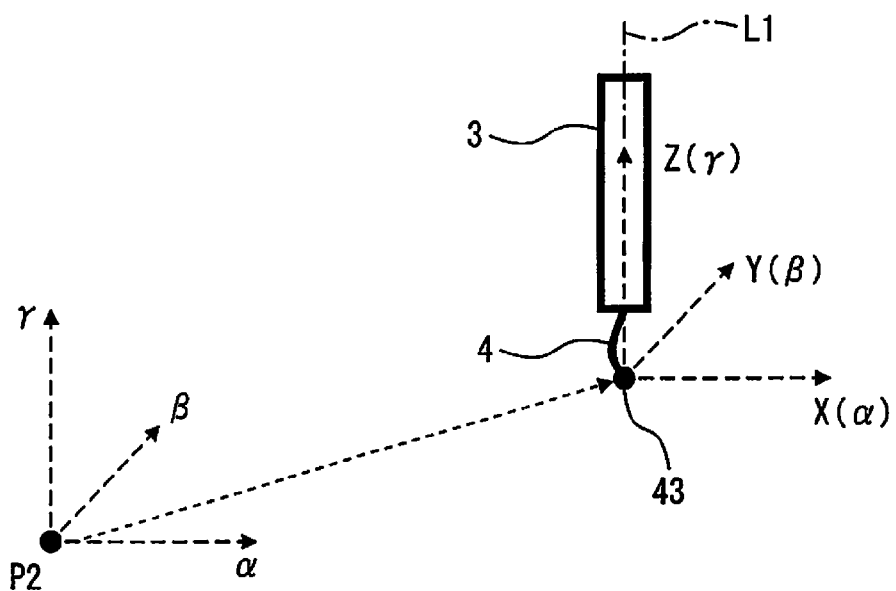
FIG. 8 is a diagram illustrating an example of tool tip coordinates.
Figure 9:
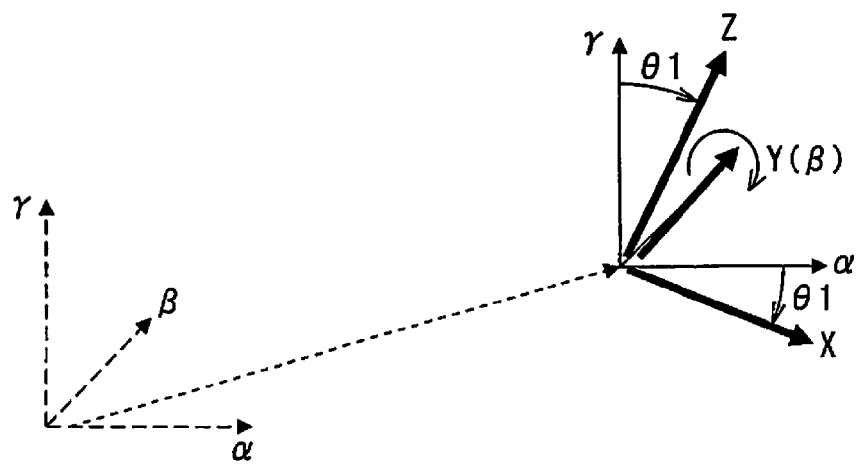
FIG. 9 is a diagram illustrating an example of tool tip coordinates different from that illustrated in FIG. 8.
Figure 10:
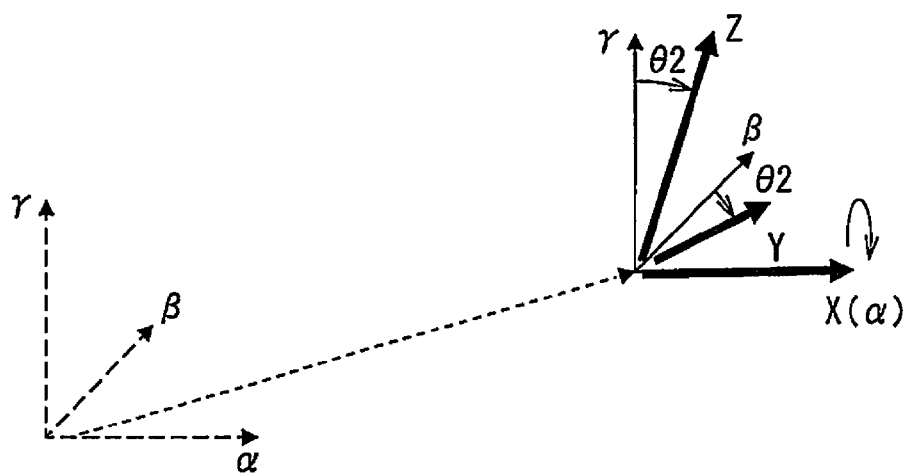
FIG. 10 is a diagram illustrating an example of tool tip coordinates different from those illustrated in FIGS. 8 and 9.

FIGS. 8 to 10 are diagrams each illustrating an example of the tool tip coordinates. As illustrated in FIG. 8, when the center line L1 of the welding torch 3 is parallel to the $\gamma$ axis of the user definition coordinate system, the inclination angle $\theta$ of the center line L1 is 0. Thus, coordinate axes (X, Y, and Z) of the tool tip coordinate system can be acquired by moving the coordinate axes ($\alpha$, $\beta$, and $\gamma$ axes) of the user definition coordinate system in parallel to the target point 43. The inclination of the welding torch 3 is represented by rotational angles ($\theta x$, $\theta y$, and $\theta z$) of the respective coordinate axes ($\alpha$, $\beta$, and $\gamma$ axes) around the target point 43. In the example illustrated in FIG. 8, the inclination angle is 0, and the inclination detection unit 144 detects rotational angles (0, 0, and 0).

As illustrated in FIG. 9, when the center line L1 (Z axis) of the welding torch 3 is inclined by an angle $\theta 1$ around the $\beta$ axis, the tool tip coordinate system is an orthogonal triaxial (X, Y, and Z axes) coordinate system rotated by an angle $\theta 1$ around the $\beta$ axis, and angles formed between the $\alpha$ and X axes and between the $\gamma$ and Z axes are both $\theta 1$. In this case, the inclination detection unit 144 detects rotational angles ($\theta 1$, 0, and $\theta 1$).

As illustrated in FIG. 10, when the center line L1 (Z axis) of the welding torch 3 is inclined by an angle $\theta 2$ around the $\alpha$ axis, the tool tip coordinate system is an orthogonal triaxial (X, Y, and Z axes) coordinate system rotated by an angle $\theta 2$ around the $\alpha$ axis, and angles formed between the $\beta$ and Y axes and between the $\gamma$ and Z axes are both $\theta 2$. In this case, the inclination detection unit 144 detects rotational angles (0, $\theta 2$, and $\theta 2$).

Figure 11:
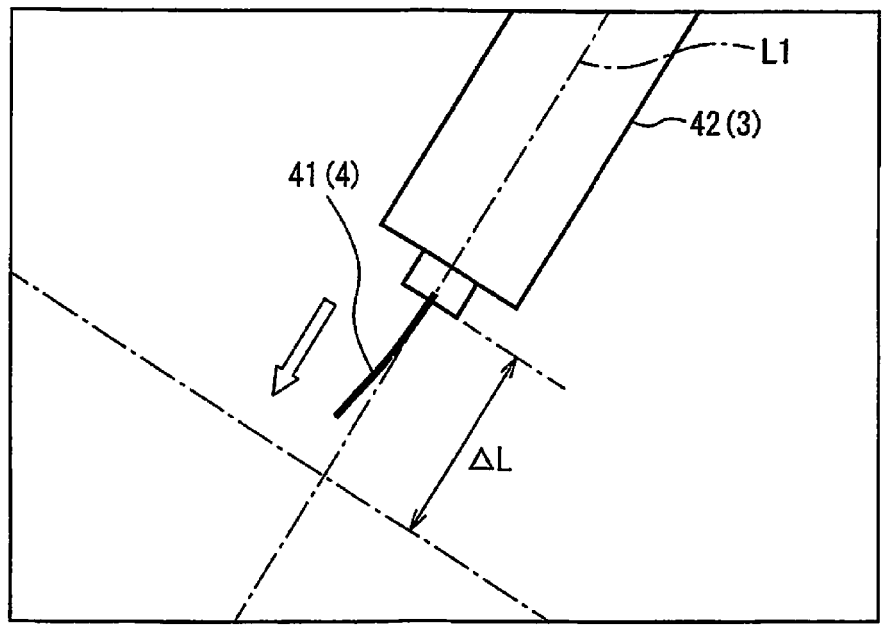
FIG. 11 is a diagram illustrating processing in a wire determination unit illustrated in FIG. 3.

The wire determination unit 145 determines whether a welding wire image 41 within a predetermined range has been recognized or not by the image recognition unit 141. The predetermined range corresponds to a wire protruding amount enabling setting of the target point 43, i.e., $\Delta L$ illustrated in FIG. 5. For example, when the wire protruding amount is shorter than ΔL as illustrated in FIG. 11, any target point 43 cannot be set on the welding wire image 41. In this case, the wire determination unit 145 outputs a determination result indicating that no welding wire image 41 within the predetermined range has been recognized. Having received the determination result, the welding machine control unit 12 (FIG. 2) outputs a control signal to the welding machine 7, and the wire feeder 6 feeds the welding wire 4 by a predetermined amount.

Figure 12:
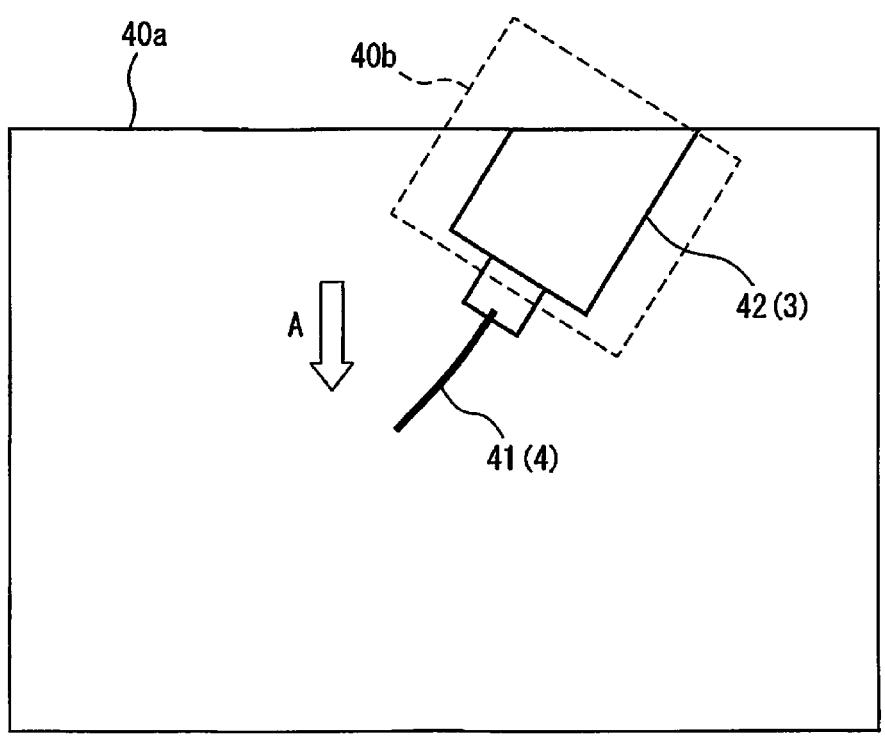
FIG. 12 is a diagram illustrating processing in a torch determination unit illustrated in FIG. 3.

The torch determination unit 146 determines whether a welding torch image 42 within a predetermined range has been recognized or not by the image recognition unit 141. The predetermined range is a range enabling detection of inclination of the welding torch 3. For example, when a predetermined range 40b of the welding torch tip part is not included in the imaging region 40a due to positional shifting of the welding torch 3 as illustrated in FIG. 12, the inclination of the welding torch 3 cannot be detected well. In this case, the torch determination unit 146 outputs a determination result indicating that no welding torch image 42 within the predetermined range 40b has been recognized. Having received the determination result, the motor control unit 13 (FIG. 2) outputs a control signal to the servo motor 21, and moves the welding torch 3 in parallel toward a center (arrow direction A in FIG. 12) of the imaging region 40a.

The correction unit 147 corrects pre-instructed command values of a position and inclination of the tool tip point (target point 43) by using a position detection value detected by the position detection unit 143 and an inclination detection value detected by the inclination detection unit 144. For example, the correction unit 147 rewrites the pre-instructed command values with the position detection value and the inclination detection value. Alternatively, the correction unit 147 calculates differences between the pre-instructed command values and the position and inclination detection values, and corrects the command values of the position and the inclination of the tool tip point by using the differences. A content of an operation program may be rewritten so as to perform correction during a specific operation. Rather than correcting the position and the inclination of the tool tip point, the correction unit 147 may correct position information regarding a workpiece that is a welding object or a tool for fixing the workpiece, or the like.

Further, the correction unit 147 corrects the position and the inclination of the tool tip point by using camera images at a different time point. For example, at a first time point, the motor control unit 13 controls the servo motor 21 to move the welding torch 3 into the dustproof cover 31. The camera control unit 11 controls the camera 32 and the light source 33 to acquire image signals of the welding torch 3 and the welding wire 4 at the first time point. The position detection unit 143 and the inclination detection unit 144 detect the position and the inclination of the tool tip point with respect to the arm tip part P1 at the first time point, and store these as reference values in a storage unit of the robot controller 10.

At a second time point elapsed by predetermined time from the first time point, the motor control unit 13 and the camera control unit 11 perform processing similar to that at the first time point, and the position detection unit 143 and the inclination detection unit 144 detect a position and inclination of the tool tip point. The correction unit 147 calculates amounts of deviation between the position and the inclination of the tool tip point at the first time point (reference values) and the position and the inclination of the tool tip point at the second time point, and corrects the command values of the position and the inclination of the tool tip point based on the amounts of deviation. As a result, when the position and the inclination of the tool tip point shift, between the first time point and second the time point, due to a change in shape of the welding torch 3 or bending habit of the welding wire 4, the shifting can be corrected.

One or all of the wire determination unit 145, the torch determination unit 146, and the correction unit 147 can be installed, instead of being included in the image processing unit 14, in the robot controller 10 independently of the image processing unit 14. In other words, the wire determination unit 145, the torch determination unit 146, and the correction unit 147 may not be included in the welding torch detector 100.

Figure 13:
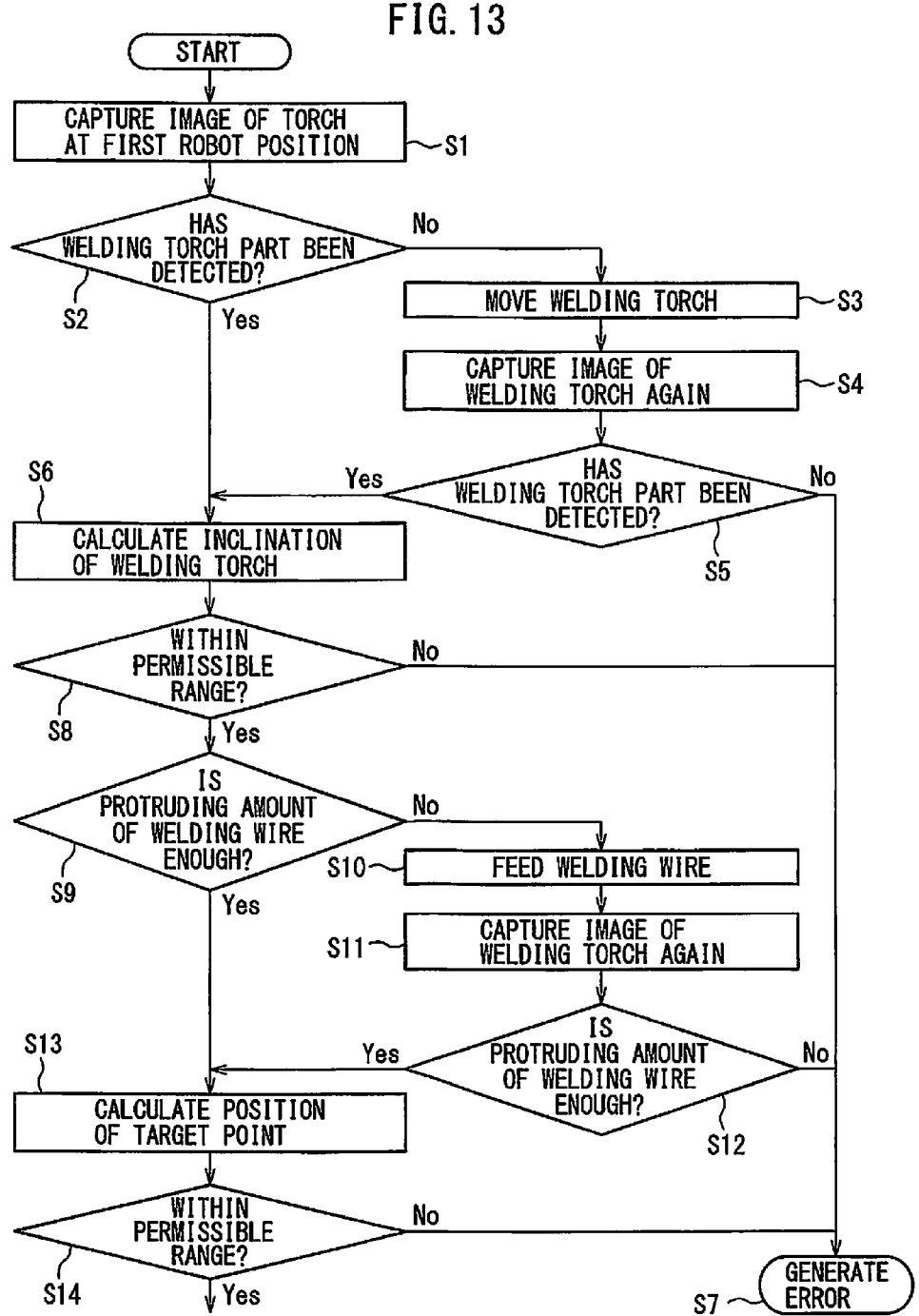
FIG. 13 is a flowchart illustrating an example of processing executed in a robot controller illustrated in FIG. 2.
Figure 14:
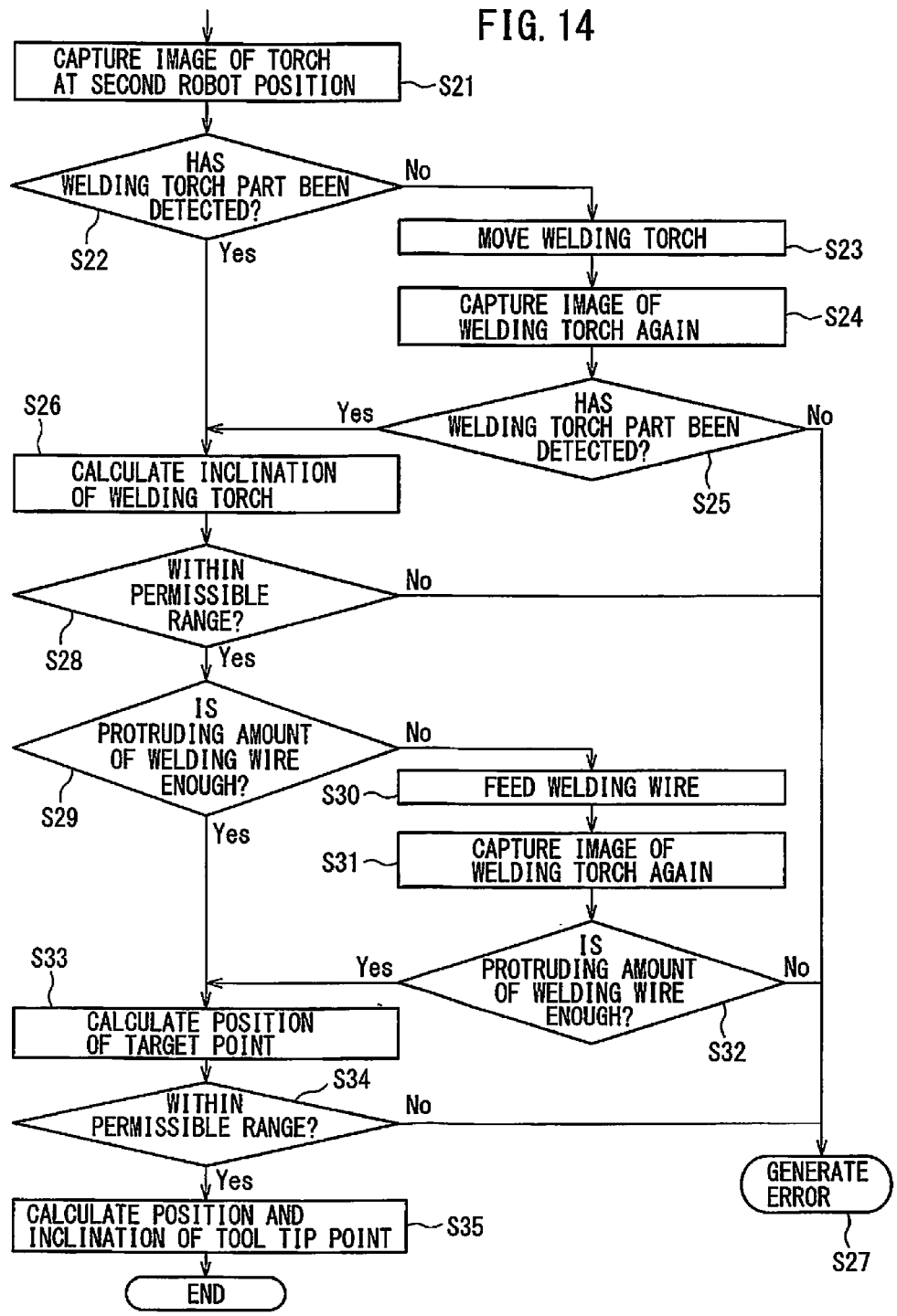
FIG. 14 is a flowchart illustrating an example of processing sequent to the processing illustrated in FIG. 13.

Next, a main operation of the welding robot system according to the embodiment will be described. FIGS. 13 and 14 are flowcharts illustrating an example of welding torch detection processing executed in the robot controller 10. The processing illustrated in the flowchart is started, for example, when a user inputs a welding torch detection command via the input unit connected to the robot controller 10. The welding torch detection command may be included in the operation program of the welding robot 1 to automatically start the welding torch detection processing.

In step S1 illustrated in FIG. 13, the motor control unit 13 outputs a control signal to the servo motor 21 to move the tip part of the welding torch 3 to the imaging region 40a (first robot position) in the dustproof cover 31 as illustrated in FIG. 7. The camera control unit 11 outputs a control signal to the camera 32 to capture an image of the tip part of the welding torch 3. The first robot position is a position in which the arm tip part P1 is rotated by a predetermined amount around the X, Y, and Z axes of the mechanical coordinate system. In the embodiment, for convenience, as illustrated in FIG. 7, a position where the attitude of the arm tip part is changed so that the X, Y, and Z axes of the arm tip part P1 can be respectively parallel to the Y, X, and -Z axes of the mechanical coordinate system and the welding torch tip part is disposed on a center of the imaging region 40a is set as the first robot position. At the first robot position, an image capturing direction of the camera 3 is parallel to the Y axis of the arm tip part P1, and the camera 32 acquires a first camera image 40 projecting the welding torch tip part on an XZ surface of the arm tip part P1 by an image capturing operation.

In step S2, by processing at the image recognition unit 141, the image signal of the first camera image 40 acquired by the camera 32 is read to recognize the first welding wire image 41 and the first welding torch image 42. By processing at the toner determination unit 146, whether the image recognition unit 141 has recognized the first welding torch image 42 within the predetermined range 40b (FIG. 12) or not is determined. The processing proceeds to step S3 when the negative decision is made in step S2, and to step S6 when positive.

In step S3, the motor control unit 13 outputs a control signal to the servo motor 21 to move the welding torch 3 by a predetermined amount along a predetermined direction (e.g., -Z axis direction). In step S4, an image of the tip part of the welding torch 3 is captured again. In step S5, as in the case of step S2, whether the image recognition unit 141 has recognized the first welding torch image 42 within the predetermined range 40b or not is determined. The processing proceeds to step S6 when the positive decision is made in step S5 and, when negative, an error is generated in step S7 to end the processing.

In step S6, by processing at the inclination detection unit 144, inclination of the welding torch 3 on the first camera image 40 is detected. In other words, the inclination of the welding torch 3 on the XZ surface illustrated in FIG. 7 is calculated. In step S8, whether the calculated inclination is within a preset permissible range or not is determined. The processing proceeds to step S9 when the positive decision is made in step S8 and, when negative, the processing proceeds to step S7 to be ended. In step S9, by processing at the wire determination unit 145, whether the image recognition unit 141 has recognized the first welding wire image 41 within the predetermined range or not is determined. In other words, whether a protruding amount of the welding wire 141 is enough or not is determined. For example, whether the wire protruding amount is enough or not is determined based on whether the wire protruding amount is equal to or larger than a predetermined length ΔL. When the negative decision is made in step S9, determining that a target point 43 cannot be set on the first welding wire image 41, the processing proceeds to step S10. The processing proceeds to step S13 when positive.

In step S10, the welding machine control unit 12 outputs a control signal to the welding machine 7, and the welding wire 4 is fed by a predetermined amount from the tip part of the welding torch 3. In step S11, as in the case of step S4, an image of the welding torch 3 is captured again. In step S12, as in the case of step S9, whether the protruding amount of the welding wire 141 is enough or not is determined. The processing proceeds to step S13 when the positive decision is made in step S12 and, when negative, the processing proceeds to step S7 to be ended.

In step S13, by processing at the setting unit 142, a target point 43 is set on the first welding wire image 41. Then, by processing at the position setting unit 143, a position of the target point 43 on the first welding wire image 41 is calculated. In other words, the position of the target point 43 on the XZ surface is calculated. In step S14, whether a protruding amount of the welding wire 4 is within a preset permissible range or not is determined. The processing proceeds to step S21 when the positive decision is made in step S14 and, when negative, the processing proceeds to step S7 to be ended.

Figure 15:
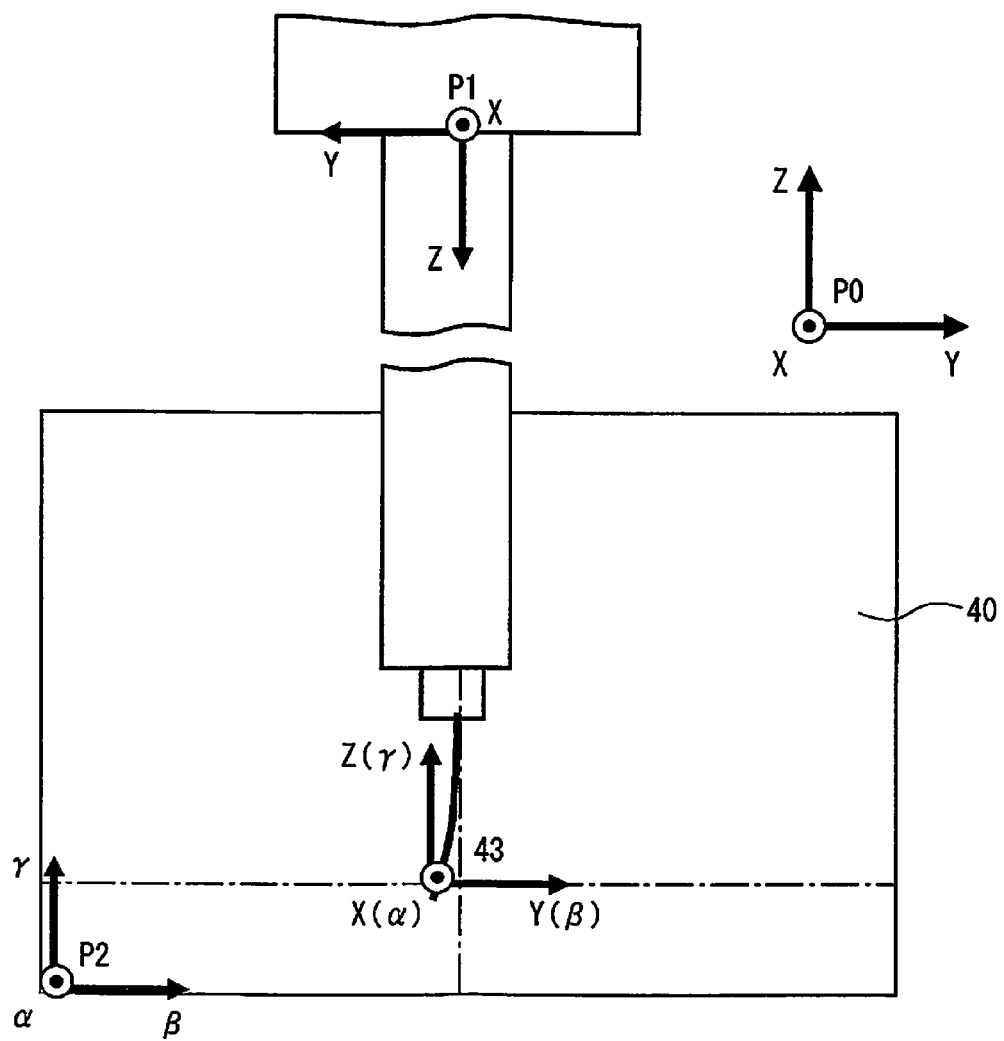
FIG. 15 is a diagram illustrating an example of an operation of the welding robot system according to the embodiment of the present invention.

In step S21 illustrated in FIG. 14, the motor control unit 13 outputs a control signal to the servo motor 21 to move the tip part of the welding torch 3 to a second robot position of the imaging region 40a in the dustproof cover 31. The camera control unit 11 outputs a control signal to the camera 32 to capture an image of the tip part of the welding torch 3. For convenience, as illustrated in FIG. 15, the second robot position is a position where the attitude of the arm tip part is changed so that the X, Y, and Z axes of the arm tip part P1 can be respectively parallel to the X, −Y, and −Z axes of the mechanical coordinate system and the welding torch tip part is disposed on the center of the imaging region 40a. In other words, a state where the arm tip part P1 is rotated by 90 degrees around the Z axis from the state illustrated in FIG. 7 is set as the second robot position. Accordingly, the arm tip part P1 is different in position and attitude between the first and second robot positions. At the second robot position, an image capturing direction of the camera 32 is parallel to the X axis, and the camera 32 acquires a second camera image 40 projecting the welding torch tip part to a YZ surface of the arm tip part P1 by an image capturing operation.

In steps S22 to S34, by using the second robot position as a reference, processing similar to that of steps S2 to S14 is executed. Specifically, in step S21, the second camera image 40 is acquired. In step S26, inclination of the welding torch 3 on the second welding torch image 42 is calculated. In step S33, a position of the target point 43 on the second welding wire image 41 is calculated.

In step S35, based on the inclination (inclination on XZ surface) of the welding torch 3 with the first robot position acquired in step S6 set as a reference, the inclination (inclination on YZ surface) of the welding torch 3 with the second robot position acquired in step S26 set as a reference, and inclination (attitude) of the arm tip part P1 at the first and second robot positions, by processing at the inclination detection unit 144, inclination (relative attitude) of the welding torch 3 in a three-dimensional space with respect to the arm tip part P1 is calculated. Moreover, based on the position (position on XZ surface) of the target point 43 with the first robot position acquired in step S13 set as a reference, a position (position on YZ surface) of the target point 43 with a second robot position acquired in step S33 set as a reference, and a position of the arm tip part P1 at the first and second robot positions, by processing at the position detection unit 143, a position (relative attitude) of the target point 43 in the three-dimensional space with respect to the arm tip part P1 is calculated. In other words, in step S35, the position and the inclination of the arm tip part are calculated. In the processing of step S35, when the position and the inclination of the arm tip part are calculated, the position and the inclination of the arm tip part P1 are used. The position and the inclination of the arm tip part P1 can be calculated based on a detection value of the encoder included in the servo motor 21.

The embodiments can provide the following operation effects.

(1) The welding torch detector 100 includes the camera 32 configured to capture the images of the welding torch 3 provided at the arm tip part of the welding robot 1 and the welding wire 4 fed from the welding torch 3 from the first and second directions, and acquire the image signals of the welding torch 3 and the welding wire 4 seen from the first and second directions, the image recognition unit 141 configured to recognize, based on the image signals acquired by the camera 32, the welding wire image 41 and the welding torch images corresponding to the first and second directions, the setting unit configured to set the target point 43 corresponding to the target position of the welding wire 4 on the welding wire images 41 recognized by the image recognition unit 141, the position detection unit 143 configured to detect, based on the welding wire image 41 recognized by the image recognition unit 141, the position of the target point 43 in the three-dimensional space, and the inclination detection unit 144 configured to detect, based on the welding torch image 42 recognized by the image recognition unit 141, the inclination of the welding torch 3 in the three-dimensional space.

Due to this, it is possible to clearly determine the position of the tool tip point even when the welding wire 4 has a habit of bending. As a result, the position of the tool tip point can be precisely matched with the wire target position, and welding work can be carried out at an accurate position. Since the inclination of the welding torch 3 is detected by using the camera image 40, even when the welding torch 3 is deformed to bend after instructing the robot, interference of the welding torch 3 with a welding tool or a peripheral device can be prevented by using the detection value.

(2) The inclination of the welding torch 3 is represented by the inclination of the tool tip point (target point 43) of the mechanical coordinate system used for position control of the welding robot 1 (FIGS. 8 to 10). This facilitates control of the position and the attitude of the tool tip point.

(3) The setting unit 142 sets, as the target point 43, the intersection point between the circular arc having the predetermined radius R around the tip 421 of the welding torch image 42 recognized by the image recognition unit 141 and the welding wire image 41 (FIG. 6), or the intersection point between the virtual line L2 away by the predetermined length ΔL from the tip 421 of the welding torch image 42 recognized by the image recognition unit 141 along the center line L1 of the welding torch image 42 and the welding wire image 41 (FIG. 5). This facilitates recognition of the position of the tool tip point. Moreover, a distance from the tip of the welding torch 3 to the tip of the welding wire 4, which is important for welding quality, can be correctly set.

(4) The welding robot system includes the servo motor 21 configured to move the welding torch 3, the wire feeder 6 configured to feed the welding wire 4 from the welding torch 3, the motor control unit 13 configured to control the servo motor 21, the welding machine control unit 12 configured to control the welding machine 7 for controlling the wire feeder 6, and the camera control unit 11 configured to control the camera 32, and the camera 32 is controlled to capture the images of the welding torch 3 and the welding wire 4 from the first and second directions (FIGS. 13 and 14). This facilitates acquisition of the camera image 40 from a plurality of directions suited for calculating the position and the inclination of the tool tip point.

(5) The welding robot system (welding torch detector 100) includes the wire determination unit 145 configured to determine whether the image recognition unit 141 has recognized the welding wire image 41 within the predetermined range or not. When the wire determination unit 145 determines that the welding wire image 41 within the predetermined range has not been recognized, the welding machine control unit 12 controls the welding machine 7 to feed the welding wire 4, and the camera control unit 11 controls the camera 32 to capture images of the welding torch 3 and the welding wire 4 after the welding wire 54 is fed. This enables setting of the target point 43 even when the wire protruding amount is short.

(6) The welding robot system (welding torch detector 100) includes the torch determination unit 146 configured to determine whether the image recognition unit 141 has recognized the welding torch image 42 within the predetermined range or not. When the torch determination unit 146 determines that the welding torch image 42 within the predetermined range has not been recognized, the motor control unit 13 controls the servo motor 21 to move the welding torch 3 toward the imaging region 40, and the camera control unit 11 controls the camera 32 to capture images of the welding torch 3 and the welding wire 4 after the welding torch is moved. This enables detection of the inclination of the welding torch 3 even when the position of the welding torch 3 shifts.

(7) The welding robot system (welding torch detector 100) includes the correction unit 147 configured to correct the pre-instructed command values of the position and the inclination of the tool tip point (target point 43) by using the position detected by the position detection unit 143 and the inclination detected by the inclination detection unit 144. This enables the position and the inclination of the tool tip point to coincide with actual command values, and a good weld can be achieved.

(8) The position of the target point 43 detected by the position detection unit 143 and the inclination of the welding torch 3 detected by the inclination detection unit 144 are compared with the preset permissible values, and when the position and the inclination are outside the permissible values, an error is generated (FIGS. 13 and 14). This facilitates determination as to necessity of inspection or replacement of the welding torch 3 when the positional shifting of the welding torch tip part is large.

According to the embodiment (FIGS. 7 and 15), the first and second directions for capturing the images of the welding wire 4 and the welding torch 3 are directions respectively parallel to the Y and X axis directions of the mechanical coordinate system. However, as long as a plurality of camera images 40 captured from different directions are acquired, the first and second directions may not be parallel to the coordinate axes of the mechanical coordinate system. When the first and second directions are not parallel to the coordinate axes of the mechanical coordinate system, a position and inclination of the tool tip point can be calculated from the plurality of camera images 40 by using coordinate conversion. Camera images 40 may be acquired from directions more than the two directions, and the configuration of the camera 32 as the imaging unit is not limited to that described above.

According to the embodiment, the arm 2 is moved by the servo motor 21 to move the camera 32 and the welding torch 3 relatively to each other. However, the camera 32 may be provided to be movable and, by moving the camera 32, the camera 32 and the welding torch 3 may be moved relatively to each other. A plurality of cameras 32 may be installed in the dustproof cover 31, and camera images 40 may be acquired at once from the plurality of directions.

According to the embodiment, the arm 2 is driven by the servo motor 21 to move the welding torch 3. However, the configuration of the torch moving unit is not limited to this. Any configuration may be employed for the wire feeder 6 which is a wire feeding unit configured to feed the welding wire 4 from the welding torch 3. According to the embodiment, the camera 32, the welding machine 7, and the servo motor 21 are respectively controlled by the camera control unit 11, the welding machine control unit 12, and the motor control unit 13. However, the configurations of these control units are not limited to those described above. The configurations of the welding torch 3 and the welding robot 1 are not limited to those described above. The present invention can be applied to a welding robot 1 which includes various welding torches 3.

One or a plurality of modified examples of the embodiment can be arbitrarily combined.

According to the present invention, not only the position of the welding wire but also the inclination of the welding torch are detected based on the image signals of the welding torch and the welding wire. As a result, even when the welding torch is deformed after instructing the robot, interference of the welding torch with the welding tool or the peripheral device can be prevented.

While the preferred embodiments of the present have been described, as obvious to those skilled in the art, various modifications and changes can be made without departing from the scope of the appended claims.

The invention claimed is:

1. A welding torch detector, comprising:
   a camera configured to capture images of a welding torch provided at an arm tip part of a welding robot and a welding wire fed from the welding torch from a plurality of directions, and acquire image signals of the welding torch and the welding wire;
   an image recognition processor configured to recognize, based on the image signals acquired by the camera, a plurality of welding wire images representing the welding wire seen from the plurality of directions and a plurality of welding torch images representing the welding torch seen from the plurality of directions;
a setting processor configured to set a target point corresponding to a target position of the welding wire on the plurality of welding wire images recognized by the image recognition processor;
a position detection processor configured to detect, based on the plurality of welding wire images recognized by the image recognition processor, a position of the target point in a three-dimensional space;
an inclination detection processor configured to detect, based on the plurality of welding torch images recognized by the image recognition processor, an inclination of the welding torch in the three-dimensional space,
wherein the inclination of the welding torch is represented by a three-dimensional orthogonal coordinate system used for position control of the welding robot at the target point; and
a correction processor configured to, based on the inclination detected by the inclination detection processor, correct a command value for the inclination of the welding torch at the target point.

2. The welding torch detector according to claim 1, wherein the setting processor is configured to set, as the target point, an intersection point between a circular arc having a predetermined radius around a tip of the welding torch image recognized by the image recognition processor and the welding wire image.

3. The welding torch detector according to claim 1, wherein the setting processor is configured to set, as the target point, an intersection point between a virtual line away by a predetermined distance from a tip of the welding torch image recognized by the image recognition processor along a center line of the welding torch image and the welding wire image.

4. A welding robot system comprising:
a robot controller comprising the welding torch detector according to claim 1;
a robot configured to move the welding torch; and
a wire feeder configured to feed the welding wire from the welding torch;
wherein the robot controller is configured to control the robot, the wire feeder, and the camera, and
wherein the robot controller is configured to control the camera to capture images of the welding torch and the welding wire from a plurality of directions.

5. The welding robot system according to claim 4, wherein
the welding torch detector further comprises a wire determination processor configured to determine whether the image recognition processor has recognized the welding wire image within a predetermined range, and
wherein the robot controller is configured to
control the wire feeder to feed the welding wire when the wire determination processor determines that the welding wire image within the predetermined range has not been recognized, and
control the camera to capture images of the welding torch and the welding wire after the wire feeder feeds the welding wire.

6. The welding robot system according to claim 4, wherein
the welding torch detector further comprises a torch determination processor configured to determine whether the image recognition processor has recognized the welding torch image within a predetermined range,
wherein the robot controller is configured to
control the robot to move the welding torch toward an imaging region of the camera when the torch determination processor determines that the welding torch image within the predetermined range has not been recognized, and
control the camera to capture an image of the imaging region after the robot moves the welding torch.

7. The welding robot system according to claim 4, wherein
the welding torch detector further comprises a correction processor configured to correct pre-instructed command values of a position and inclination of the target point by using the position detected by the position detection processor and the inclination detected by the inclination detection processor.

8. The welding robot system according to claim 7, wherein,
the robot controller is configured to control the robot and the camera to move the welding torch to a predetermined position to acquire image signals of the welding torch and the welding wire at a first time point and a second time point after a predetermined time elapses from the first point time, and
when a position of the target point detected by the position detection processor and inclination of the welding torch detected by the inclination detection processor at the first time point are deviated from a position of the target point detected by the position detection processor and inclination of the welding torch detected by the inclination detection processor at the second time point, the correction processor is configured to correct the command values based on an amount of the deviation.

* * * * *